Patented Oct. 27, 1925.

1,558,589

UNITED STATES PATENT OFFICE.

RAY B. CANUTE, OF MINNEAPOLIS, AND ERVIN H. TANK, OF ST. PAUL, MINNESOTA.

COMPOSITION FOR PREVENTING CORROSION.

No Drawing.          Application filed October 16, 1924. Serial No. 744,082.

*To all whom it may concern:*

Be it known that we, RAY B. CANUTE and ERVIN H. TANK, citizens of the United States, residing at Minneapolis and St. Paul, respectively, in the counties of Hennepin and Ramsey, respectively, and State of Minnesota, have invented certain new and useful Improvements in Compositions for Preventing Corrosion; and we do hereby declare the following to be a full, clear, and exact description of the invention, such as will enable others skilled in the art to which it appertains to make and use the same.

Our invention provides as a new article of manufacture a semi-liquid or paste-like composition which, when applied as a coating on battery terminals, will prevent corrosion thereof.

This composition contains carbonate of soda, petroleum jelly and oil of cedar. In practice we have obtained the best results by using the said ingredients in approximately the following proportions, to-wit: carbonate of soda, 4 pounds, petroleum jelly, 5 pounds, oil of cedar, 1 ounce. In the compounding of our improved battery-coating substance the carbonate of soda is sifted one pound at a time, to remove lumps etc., into the petroleum jelly and at the same time mixed therewith. After the carbonate of soda is thoroughly mixed into the jelly the oil of cedar is stirred therein, which slightly thins the composition.

The composition thus produced will be of a consistency to be easily applied to battery terminals but will not run.

This improved composition has been put into actual use and has been found highly efficient for the purpose above stated, and will prevent corrosion from taking place on battery terminals to which it is applied.

Workmen's hands may be protected from the acid of batteries by rubbing the composition thereon. The composition is good for burns in that the soda forms a coating to keep the air from the injury and it also has a soothing effect. The petroleum jelly also acts as an antiseptic.

What we claim is:

A composition of the character described composed of the following ingredients approximately in the proportions stated, towit: carbonate of soda, 4 pounds; petroleum jelly, 5 pounds; oil of cedar, 1 ounce.

In testimony whereof we affix our signatures.

RAY B. CANUTE.
ERVIN H. TANK.